United States Patent Office.

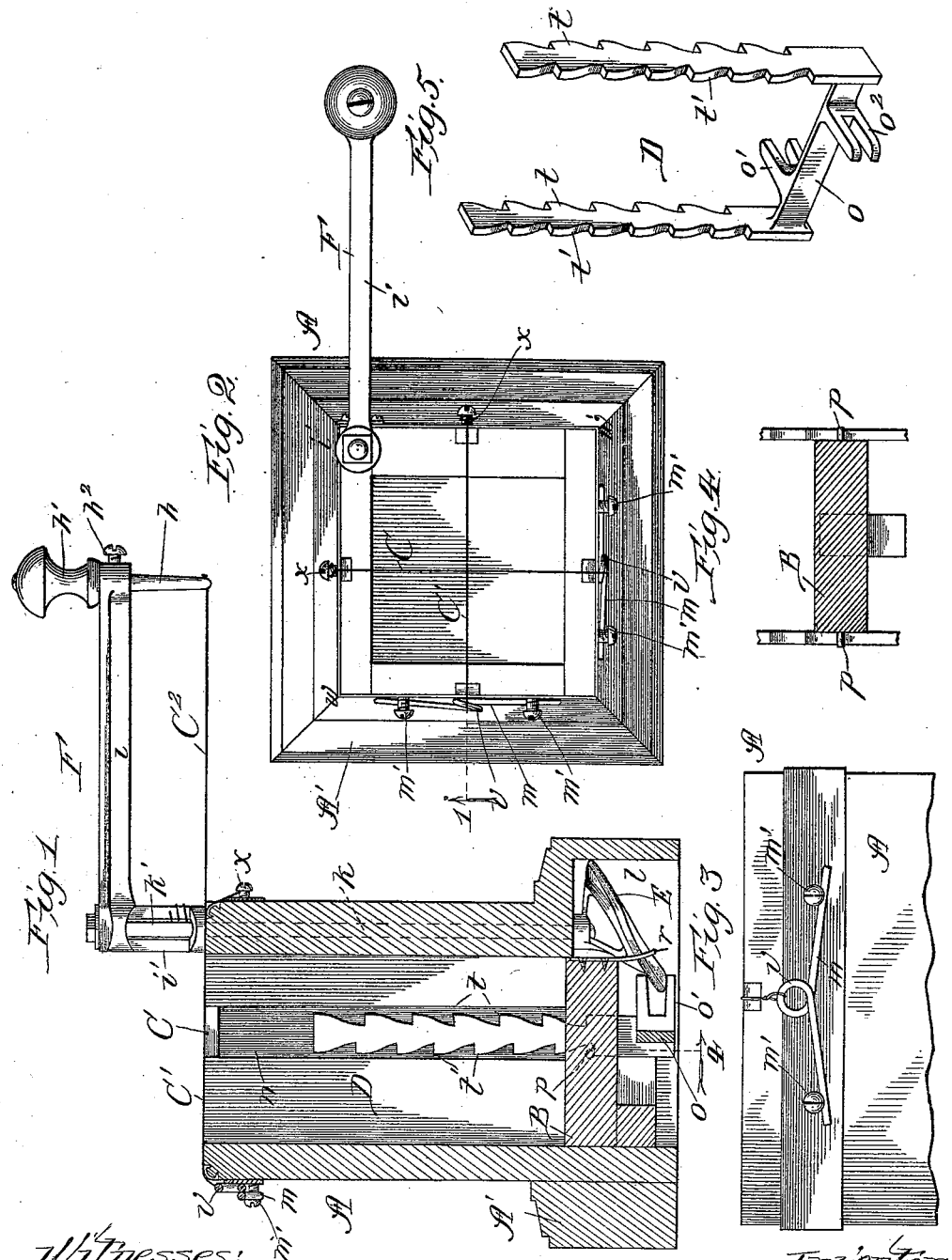

PER F. NELSON, OF CHICAGO, ILLINOIS.

DIVIDING-MACHINE FOR CAKED ARTICLES.

SPECIFICATION forming part of Letters Patent No. 554,830, dated February 18, 1896.

Application filed August 29, 1895. Serial No. 560,871. (Model.)

*To all whom it may concern:*

Be it known that I, PER F. NELSON, a subject of the King of Sweden and Norway, residing at Chicago, in the county of Cook and State of Illinois, have invented a new and useful Improvement in Dividing-Machines for Caked Articles, of which the following is a specification.

The object of my invention is to provide retail dealers with a machine for cutting into smaller cakes compressed yeast, soap, and the like articles, furnished them in large cakes by the wholesale dealer, thereby to facilitate the operation of dividing the article into cakes of the size in which it is sold to the consumer.

Articles like compressed yeast vary in price, so that as the price to the retail dealer is greater or less the size of the cakes in which he sells it should be smaller or larger. Accordingly it is my further object to adapt my aforesaid machine to vary the size of the cakes cut by it in accordance with the market price of the article.

To these ends I provide the machine illustrated in the accompanying drawings, in which—

Figure 1 is a view in sectional elevation of my dividing-machine, the section being taken at the line 1 on Fig. 2 and viewed in the direction of the arrow; Fig. 2, a plan view of the machine; Fig. 3, a broken view of the same in side elevation; Fig. 4, a section taken at the line 4 on Fig. 1 and viewed in the direction of the arrow, and Fig. 5 a perspective view of a rack detail.

A is a case formed of wood, sheet metal, or any other suitable material and preferably of the rectangular shape illustrated, with an expanded base A'. The interior of the case should conform to the shape and size of the cake to be divided. Within the case, which should be open at both ends, is a reciprocating platform or plunger B, provided at one side with a spring $r$ to bear against an inner side of the case and hold the plunger at any point therein to which it is moved; and at each of two opposite sides of the plunger there projects from it a pin $p$.

D is a rack device, comprising two parallel bars connected at corresponding ends by a cross-bar $o$, from opposite sides of which project the bifurcated fingers $o'$ and $o^2$, each of the parallel bars being provided, preferably along both of their edges, with series of teeth $t$ and $t'$, the members of the series $t$ on each bar being equidistant apart, and those of each series $t'$ being equidistant apart, but the former being closer together than the latter.

The rack device D fits, to adapt it to be reciprocated and guided in its movements, (though the fit is somewhat loose,) in vertical grooves $n$, provided in opposite inner sides of the case A, and into which the pins $p$ project from the plunger B. Only one of the grooves $n$ is illustrated in Fig. 1, owing to the nature of the view thereby presented.

Across the open top of the case are strung wires C and C', at right angles to each other, intersecting at the center of the case and affording cutters against which the plunger, in its upward stroke, carries the article to be divided. One end of each wire is permanently fastened at a side of the case, as indicated at $x\ x$ in Fig. 2, and its other end is separably fastened at the opposite side of the case, the means illustrated for the fastening comprising a pair of studs $m'$ projecting from the respective side of the case to be engaged by a wire $m$, affording a springy fastener by bending it at its center into a loop $v$ and there fastening the free end of its cutter-wire, the retaining function of the fastener being afforded by adjusting the opposite free ends of the wire under a pair of the studs $m'$, whereby, moreover, the cutter-wire is held taut. The purpose of rendering one end of each of the cutters C C' releasable is to open the end of the case which they cross for the admission into it, against the plunger, of the cake of the compressed yeast, or other article, to be divided. I do not, however, necessarily employ the particular construction of the fastening means for the cutter-wires described; nor is it essential to my invention that the cutters shall be wires, as they may be adequately stout thread or twine, or even metal blades.

E is an annular cam supported in a chamber $l$, formed in the base A', to engage with one of the bifurcated fingers $o'$ or $o^2$, which thus affords a bearing for the cam on the rack device, the support for the cam comprising a rotary shaft $k$, extending through a vertical opening in one corner of the case, leading from the upper end thereof to the chamber $l$, and joined at its lower end to the cam at the center of the latter. On the upper end of the shaft is fastened a handle F, carrying a cutter $C^2$ operative in the direction of turning the handle to sweep across the upper end of the case A and cut horizontally the portion of the cake protruded by the plunger beyond such end and thereby subdivided by the cutters C and C'. As shown, the handle F comprises a bar $i$ provided at one end with a socket $i'$ fitting over the flattened projecting end $k'$ of the shaft $k$, and provided at its opposite end with a vertical rotary stem $h$, carrying a loose knob $h'$ and adapted to be fastened by a set-screw $h^2$, the cutter $C^2$ comprising a wire stretched between and fastened at its opposite ends respectively to the lower end of the stem $h$ and the socket $i'$, the rotary function of the stem serving for tightening the cutter-wire. As in the case of the cutters C and C', the cutter $C^2$ need not be, though it is, preferably, a wire.

To divide a cake, say, of compressed yeast it is inserted into the case A through its upper end against the surface of the plunger B, which is then at its lowest position, if the depth of the cake so requires. By turning the handle F toward the right the cam E is also turned, and, being permanently in engagement with its bearing on the rack device D, raises the latter, the shape of the cam being such as to cause a half-revolution thereof to raise the rack device the extent of one of its teeth and the other half of the revolution retracting it the same extent to bring another pair of its corresponding teeth on the parallel bars underneath the pins $p$ on the plunger, by engagement with which pins the rack device in its upward stroke raises the plunger, with the cake imposed upon it, accordingly, and while the rack device is being retracted for another operation (to permit which retraction the loose fit of the rack-bars in their grooves $n$ adapts the bars to be forced laterally by engagement of the inclined planes of their edges with the pins $p$ to clear the latter, after which the bars right themselves by their gravity) the plunger is held in the position to which it was last adjusted by the spring $r$. As will be seen, each step of the plunger, which accords with the length of a tooth of the rack device, forces the cake to be divided to that extent past the stationary cutters C and C', which thereby divide it into four equal sections, this division, according to the arrangement of the parts of the machine, taking place while the handle F is being turned from the point $w$, Fig. 2, to the point $w'$, and in that half of the further revolution of the handle between the points $w'$ and $w$, wherein the rack device drops, the cutter $C^2$ is swept horizontally across the upper end of the case close to the cutters C and C' and cuts the sections from the body of the cake. As the price of the article to be divided advances or decreases rack devices D having the teeth close together in the series or farther apart may be employed. Thus the rack device D illustrated may be used in the machine by reversing it to cause the teeth $t$ to engage the pins $p$ when a reduction occurs in the price of the article to be divided, and for further changes in the price other racks may be provided, with their teeth spaced apart to regulate the extent of the outward stroke of the plunger B in accordance with the reduced or increased thickness of the sections of the cake suitable for the regular price at which the section is sold to the consumer.

To restore the plunger to its normal position after it has been advanced, after operating the machine, toward the cutters at its discharge end the case A is turned over to lie on its side opposite that at which the teeth of the racks engage the pins $p$, whereby the gravity of the rack device causes its arms to fall away in the adequately wide guide-grooves $n$ from the plane of movement of the pins, which, being thus free from obstruction by the rack-teeth, will pass by the latter and permit the plunger to be forced inward.

Obviously, my machine may, without departure from my invention, be adapted, by increasing or decreasing the number of the cutters C and C', to divide the cake of the article to be operated upon into more or fewer than four sections; and the dimensions of the case may be varied to accommodate a cake of material of any size and kind for which my machine is adapted to subserve its purpose. Moreover, the details of construction of the machine herein shown and described may be variously changed, otherwise than as hereinbefore suggested, without thereby departing from my invention. Hence I do not wish to be understood as intending to limit my invention to such details.

For use as a bread-cutter the cutters C and C' may be omitted entirely from the machine, which will then still be within my invention.

What I claim as new, and desire to secure by Letters Patent, is—

1. In a dividing-machine for caked articles, the combination with a suitable case for the article to be divided, of a stationary cutter, a plunger confined in the case, means for advancing the plunger toward said cutter, and a cutter supported to operate across said stationary cutter and connected with said plunger-advancing means to actuate the same, substantially as and for the purpose set forth.

2. In a dividing-machine for caked articles, the combination with a suitable case for the article to be divided, of stationary intersecting cutters, a plunger confined in the case, means for advancing the plunger toward said cutters, and a cutter supported to operate across said stationary cutters and connected with said plunger-advancing means to actuate the same, substantially as and for the purpose set forth.

3. In a dividing-machine for caked articles, the combination with a suitable case for the article to be divided, of stationary intersecting cutters, a plunger confined in the case, means for advancing the plunger toward said cutters, and a rotary cutter supported to operate from a pivotal point at one side of the case across said stationary cutters and connected with said plunger-advancing means to actuate the same, substantially as and for the purpose set forth.

4. In a dividing-machine for caked articles, the combination with a suitable case, of stationary intersecting cutters, a spring-controlled plunger confined in the case, a rack device for advancing the plunger step by step toward said cutters, a cam engaging said rack device and a rotary handle operatively connected with the cam and carrying a cutter operated by turning the handle to cut across said stationary cutters, substantially as and for the purpose set forth.

5. In a dividing-machine for caked articles, the combination with a suitable case, of stationary intersecting cutters, a spring-controlled plunger confined in the case, a rack device for advancing the plunger step by step toward said cutters, a cam engaging said rack device, a rotary shaft journaled in the case and carrying at one end said cam and at its opposite end a handle for rotating it, and a cutter on the handle operated by turning the handle to actuate the cam to advance the plunger and sweep the cutter carried by the handle across the stationary cutters, substantially as and for the purpose set forth.

6. In a dividing-machine for caked articles, the combination with a suitable case, of stationary intersecting cutters, a spring-controlled plunger confined in the case, and having pins projecting from its opposite sides, a reversible rack device for engaging said pins to advance the plunger step by step toward said cutters and comprising parallel bars in guide-grooves in the case and having differential series of teeth along their opposite edges and connected by a cross-bar carrying cam-bearings, a rotary cam engaging one of said bearings, a rotary shaft journaled in the case and carrying at one end said cam and at its opposite end a handle for rotating it, and a cutter on the handle operated by turning the handle to actuate the cam to advance the plunger and sweep the cutter carried by the handle across the stationary cutters, substantially as and for the purpose set forth.

7. A dividing-machine for caked articles, comprising, in combination, a case A provided at one end with stationary adjustable cutters C and C', a plunger B carrying a spring $r$ and pins $p$, a rack device having parallel bars provided with teeth and connected by a cross-bar carrying a cam-bearing, said rack device being movable in guide-grooves in the case to engage said pins and advance the plunger step by step, a cam E in the base of the case, engaging said bearing, a rotary vertical shaft $k$ carrying said cam at its lower end, a handle F adjusted at its socket $i$ upon the upper end of the shaft and having a rotary stem $h$ at its outer end, and a cutter $C^2$ extending between said stem and socket, the whole being constructed and arranged to operate substantially as and for the purpose set forth.

8. In a dividing-machine for caked articles, the combination with a suitable case for the article to be divided, of a plunger confined in the case, means for advancing the plunger, and a rotary cutter supported to operate from a pivotal point at one side of the case across the end thereof and connected with said plunger-advancing means to actuate the same, substantially as and for the purpose set forth.

PER F. NELSON.

In presence of—
J. N. HANSON,
J. H. LEE.